US012573207B2

(12) United States Patent
Kim

(10) Patent No.: US 12,573,207 B2
(45) Date of Patent: Mar. 10, 2026

(54) DRIVER ASSISTANCE APPARATUS AND DRIVER ASSISTANCE METHOD

(71) Applicant: HL KLEMOVE CORP., Incheon (KR)

(72) Inventor: Daejong Kim, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 364 days.

(21) Appl. No.: 18/181,770

(22) Filed: Mar. 10, 2023

(65) Prior Publication Data

US 2023/0290158 A1    Sep. 14, 2023

(30) Foreign Application Priority Data

Mar. 10, 2022    (KR) ........................ 10-2022-0029784

(51) Int. Cl.
| | |
|---|---|
| *G06K 9/00* | (2022.01) |
| *G01S 19/48* | (2010.01) |
| *G06T 7/70* | (2017.01) |
| *G06V 20/58* | (2022.01) |

(52) U.S. Cl.
CPC .......... *G06V 20/582* (2022.01); *G01S 19/485* (2020.05); *G06T 7/70* (2017.01); *G06T 2207/20081* (2013.01); *G06T 2207/20084* (2013.01)

(58) Field of Classification Search
CPC .......... G06T 2207/20081; G06T 2207/20084; G06V 10/764; G06V 10/82; G06V 20/582; G06V 20/588
See application file for complete search history.

(56) References Cited

U.S. PATENT DOCUMENTS

| | | | | |
|---|---|---|---|---|
| 11,719,783 B2 * | 8/2023 | Amarnathan | ......... | G01S 5/0072 |
| | | | | 455/456.1 |
| 2008/0040029 A1 * | 2/2008 | Breed | .................... | G08G 1/161 |
| | | | | 701/514 |
| 2020/0210726 A1 * | 7/2020 | Yang | ...................... | G06V 10/70 |
| 2021/0061304 A1 * | 3/2021 | Braunstein | ............. | G08G 1/167 |
| 2022/0057473 A1 * | 2/2022 | Amarnathan | ......... | G01S 5/0289 |
| 2022/0189060 A1 * | 6/2022 | Türkoglu | ............... | G06V 10/82 |

FOREIGN PATENT DOCUMENTS

| | | |
|---|---|---|
| KR | 10-1751298 B1 | 6/2017 |
| KR | 20190024098 A | 3/2019 |
| KR | 20190064228 A | 6/2019 |
| KR | 20190088119 A | 7/2019 |
| KR | 20200044164 A | 4/2020 |
| KR | 20220013203 A | 2/2022 |

OTHER PUBLICATIONS

González, Álvaro, Luis M. Bergasa, and J. Javier Yebes. "Text Detection and Recognition on Traffic Panels From Street-Level Imagery Using Visual Appearance." IEEE Transactions On Intelligent Transportation Systems 15.1 (2014). (Year: 2014).*
Peker, Ali Ufuk, et al. "Fusion of map matching and traffic sign recognition." 2014 IEEE Intelligent Vehicles Symposium Proceedings. IEEE, 2014. (Year: 2014).*
KR OA dated Mar. 22, 2023.

* cited by examiner

*Primary Examiner* — Hadi Akhavannik
(74) *Attorney, Agent, or Firm* — Harvest IP Law, LLP

(57) ABSTRACT

Disclosed herein is a driver assistance apparatus including a camera installed on a vehicle, having a forward field of view of the vehicle, and configured to acquire image data and a processor configured to process the image data. The processor may acquire image data of road guide signs from the image data and identify a position of the vehicle based on the image data of the road guide signs.

15 Claims, 6 Drawing Sheets

FIG. 3

INPUT     FILTER     CONVOLUTION     FEATURE MAP $1*1+0*0+0*0+$
$1*0+1*1+1*1+$
$0*1+1*1+0*1$
$=4$

INPUT     FILTER     CONVOLUTION     FEATURE MAP $0*1+0*0+0*0+$
$1*0+1*1+1*1+$
$1*1+0*1+0*1$
$=3$

DRIVER ASSISTANCE APPARATUS AND DRIVER ASSISTANCE METHOD

CROSS-REFERENCE TO RELATED APPLICATION

This application claims the benefit of Korean Patent Application No. 10-2022-0029784, filed on Mar. 10, 2022 in the Korean Intellectual Property Office, the disclosure of which is incorporated herein by reference.

BACKGROUND

1. Field

Embodiments of the present disclosure relate to a driver assistance apparatus, and more specifically, to a driver assistance apparatus and a driver assistance method capable of recognizing road guide signs.

2. Description of the Related Art

Vehicles are the most common means of transportation in modern society, and the number of people who uses the vehicles is increasing. There are advantages such as easy long-distance transportation and comfortable living due to the development of a vehicle technology, but road traffic conditions degrade in places with high population density such as Korea, which often causes serious traffic congestion.

Recently, research on vehicles equipped with an advanced driver assist system (ADAS) for actively providing information on vehicle conditions, driver conditions, and/or surrounding environments is being actively conducted to reduce the driver's burden and enhance the driver's convenience.

As one example of the ADAS mounted on the vehicles, there is lane departure warning (LDW), lane keeping assist (LKA), high beam assist (HBA), autonomous emergency braking (AEB), traffic sign recognition (TSR), adaptive cruise control (ACC), blind spot detection (BSD), or the like.

The driver assist system may collect information on the surrounding environment and process the collected information. In addition, the driver assist system may recognize objects and design routes for the vehicles to travel based on results of processing the collected information.

In this case, the driver assist system may identify a current position of the vehicle based on signals from a global navigation satellite system (GNSS) in order to design a route along which the vehicle will travel. However, when the GNSS signals are not smoothly received, there is a problem in that the driver assist system may not accurately identify the position of the vehicle.

SUMMARY

Therefore, it is an aspect of the present disclosure to provide a driver assistance apparatus capable of identifying a position of a vehicle using road guide signs.

It is another aspect of the present disclosure to provide a driver assistance apparatus and a driver assistance method capable of acquiring position information from road guide signs using machine learning.

Additional aspects of the disclosure will be set forth in part in the description which follows and, in part, will be obvious from the description, or may be learned by practice of the disclosure.

In accordance with one aspect of the present disclosure, a driver assistance apparatus may include a camera installed on a vehicle, having a forward field of view of the vehicle, and configured to acquire image data and a processor configured to process the image data. The processor may acquire image data of road guide signs from the image data, and identify a position of the vehicle based on the image data of the road guide signs.

The processor may acquire a feature region from the image data of the road guide signs, and identify a position of the vehicle based on image data of the feature region.

The processor may identify a road number, a regional name, and a distance to a junction based on an image data of the feature region, and identify the position of the vehicle based on the road number, the regional name, and the distance to the junction.

The processor may identify a position of the junction based on the road number and the regional name, and identify, as the position of the vehicle, a position moved from the position of the junction along a road of the road number as much as the distance to the junction.

The processor may identify a position of the vehicle based on an output signal of a global navigation satellite system (GNSS) signal receiver of the vehicle, and identify a position of the vehicle based on the image data of the road guide signs based on a reception intensity of a GNSS signal of the GNSS signal receiver being smaller than or equal to a reference intensity.

The processor may train a learning model based on the position of the vehicle based on the output signal of the GNSS signal receiver and the image data, and identify a position of the vehicle using the trained learning model based on the signal intensity of the GNSS signal of the GNSS signal receiver being smaller than or equal to the reference intensity.

The processor may acquire a feature region from the image data of the road guide signs using the trained learning model, and identify the position of the vehicle based on image data of the feature region using the trained learning model.

The learning model may include a convolutional neural network (CNN). The processor may input the image data into the CNN, identify an estimated position of the vehicle based on an output of the CNN, and train the CNN based on an error between the position of the vehicle based on the output signal of the GNSS signal receiver and the estimated position.

The learning model may include a convolutional neural network (CNN). The processor may input the image data into the trained CNN, and identify a position of the vehicle based on an output of the trained CNN.

In accordance with another aspect of the present disclosure, a driver assistance method may include acquiring image data through a camera having a forward field of view of a vehicle, acquiring image data of road guide signs from the image data, and identifying a position of the vehicle based on the image data of the road guide signs.

The identifying of the position of the vehicle may include acquiring a feature region from the image data of the road guide signs, and identifying a position of the vehicle based on image data of the feature region.

The identifying of the position of the vehicle may include identifying a road number, a regional name, and a distance to a junction based on an image data of the feature region, and identifying a position of the vehicle based on the road number, the regional name, and the distance to the junction.

The identifying of the position of the vehicle may include identifying a position of the junction based on the road number and the regional name, and identifying, as the position of the vehicle, a position moved from the position of the junction along a road of the road number as much as the distance to the junction.

The driver assistance method may further include identifying a position of the vehicle based on an output signal of a global navigation satellite system (GNSS) signal receiver of the vehicle, and identifying a position of the vehicle based on the image data of the road guide signs based on a reception intensity of a GNSS signal of the GNSS signal receiver being smaller than or equal to a reference intensity.

The identifying of the position of the vehicle may include training a learning model based on the position of the vehicle based on the output signal of the GNSS signal receiver and the image data, and identifying a position of the vehicle using the trained learning model based on the reception intensity of the GNSS signal of the GNSS signal receiver being smaller than or equal to the reference intensity.

The identifying of the position of the vehicle may include acquiring a feature region from the image data of the road guide signs using the trained learning model, and identifying a position of the vehicle based on image data of the feature region using the trained learning model.

The learning model includes a convolutional neural network (CNN). The training of the learning model may include inputting the image data into the CNN, identifying an estimated position of the vehicle based on an output of the CNN, and training the CNN based on an error between the position of the vehicle based on the output signal of the GNSS signal receiver and the estimated position.

The learning model includes a convolutional neural network (CNN). The identifying of the position of the vehicle may include inputting the image data into the trained CNN, and identifying a position of the vehicle based on an output of the trained CNN.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 shows one example in which the driver assistance apparatus according to one embodiment performs a convolution of image data;

4

Figure 8:
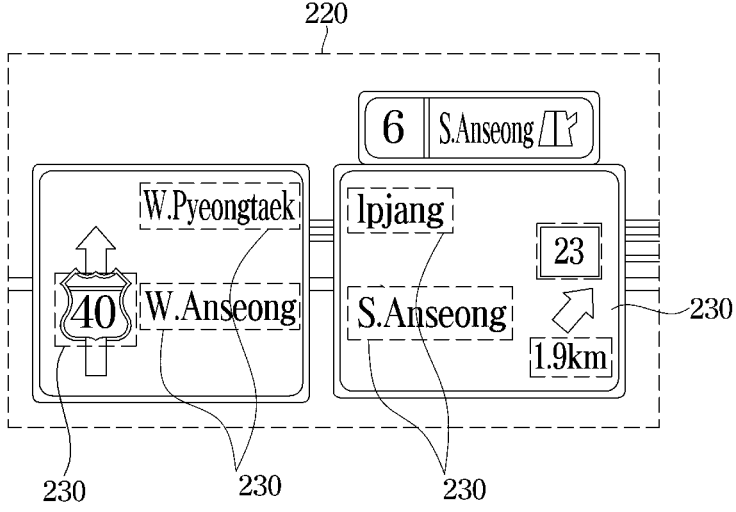

FIG. 8 shows one example in which the driver assistance apparatus according to one embodiment identifies a feature region of the road guide signs.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Figure 1:
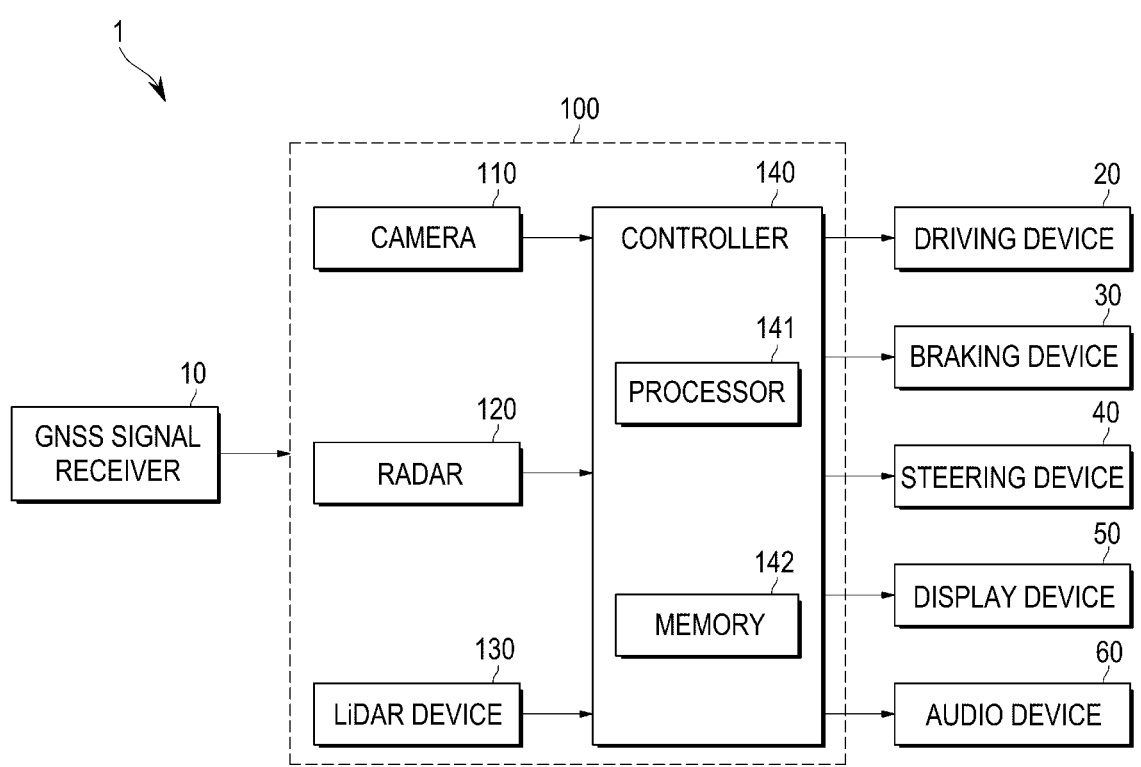
FIG. 1 shows a configuration of a vehicle and a driver assistance apparatus according to one embodiment.
Figure 2:
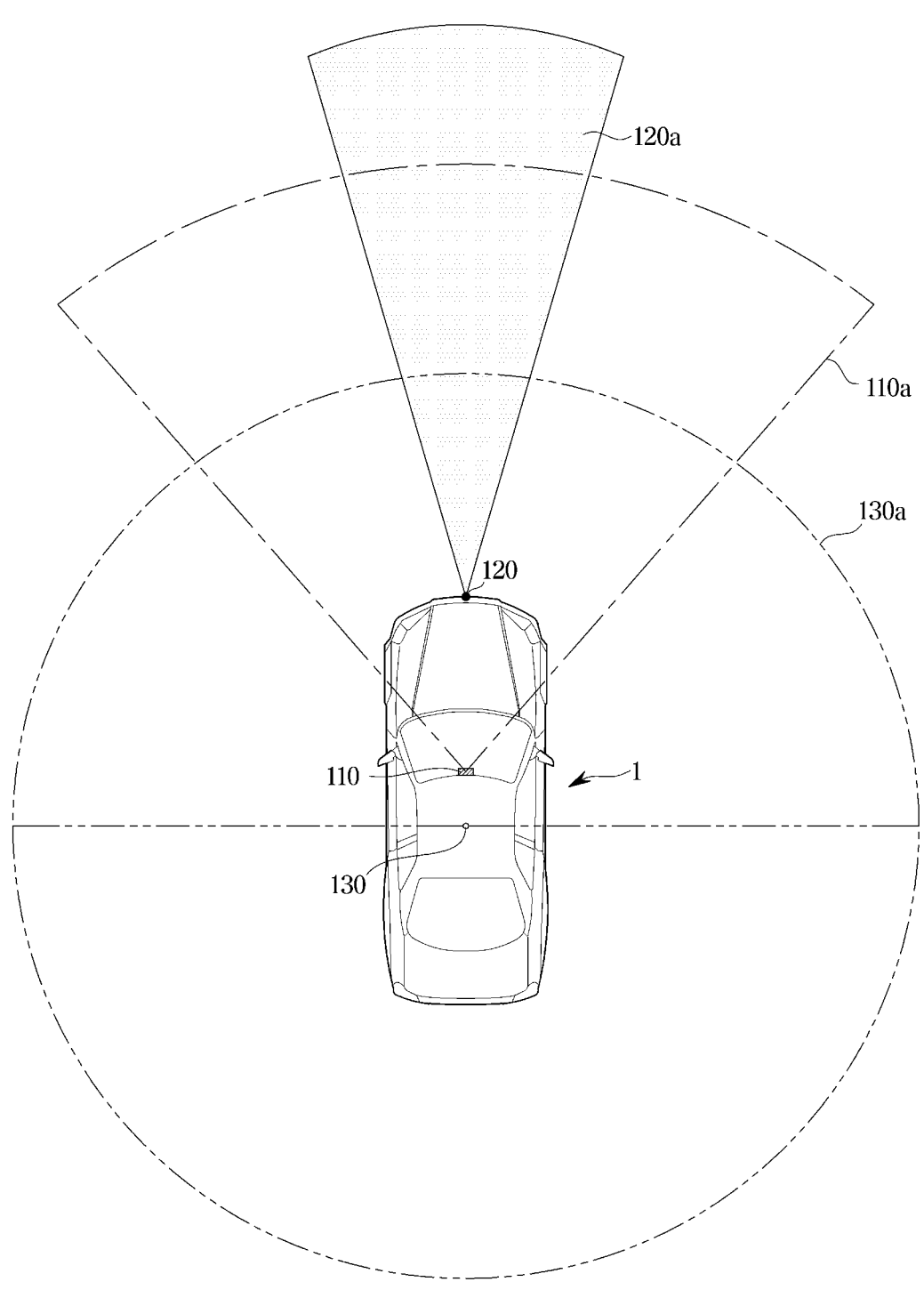
FIG. 2 shows fields of view of a camera and radar included in the driver assistance apparatus according to one embodiment.
Figure 3:
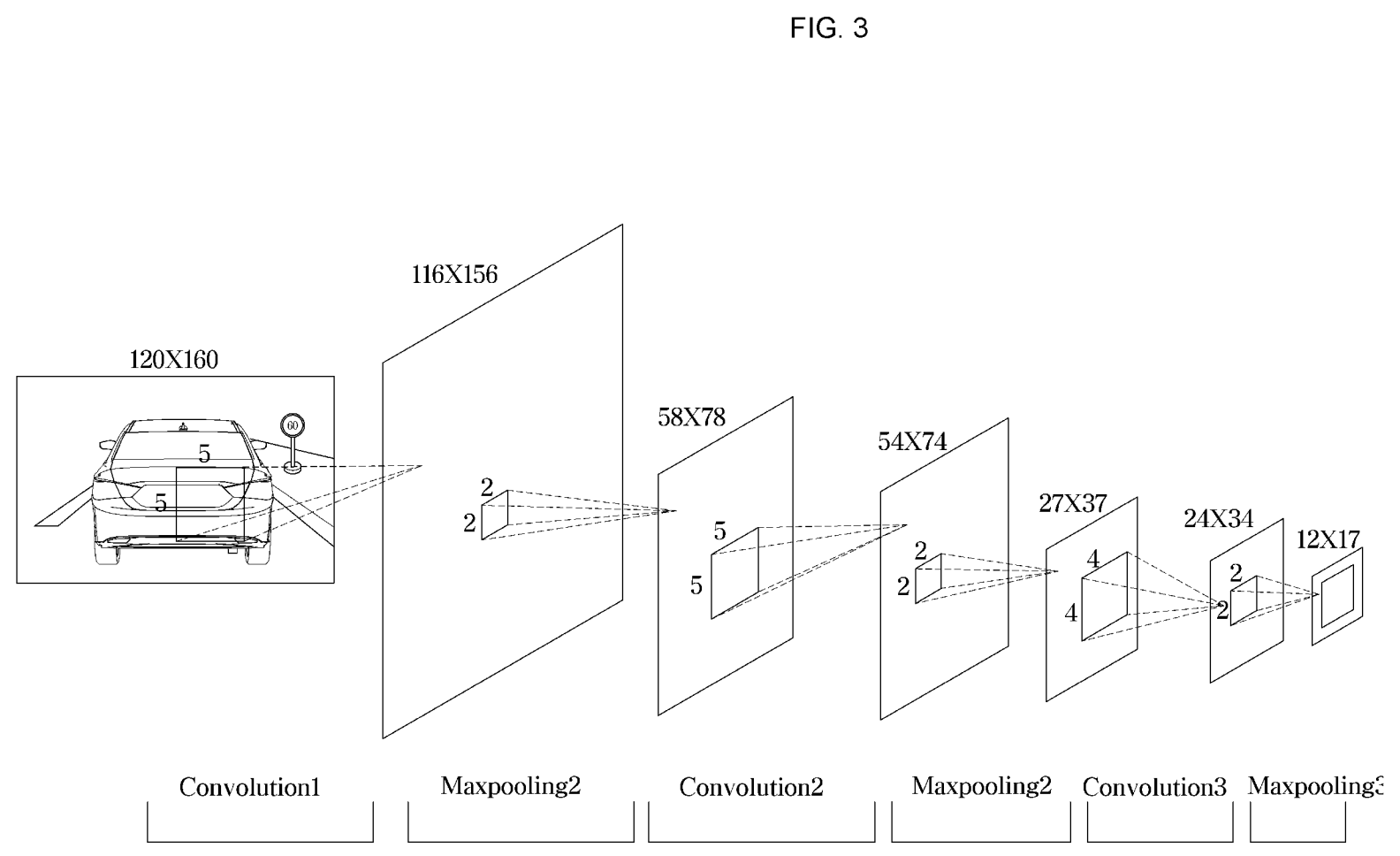
Figure 4A:
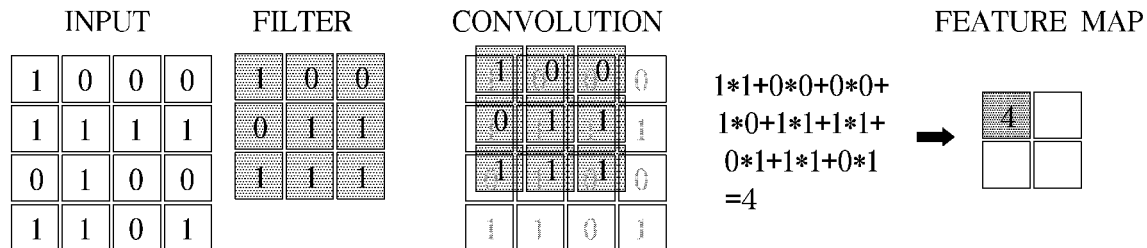
FIG. 4(A) and FIG. 4(B) are a view showing the convolution of image data by the driver assistance apparatus according to one embodiment.
Figure 4B:
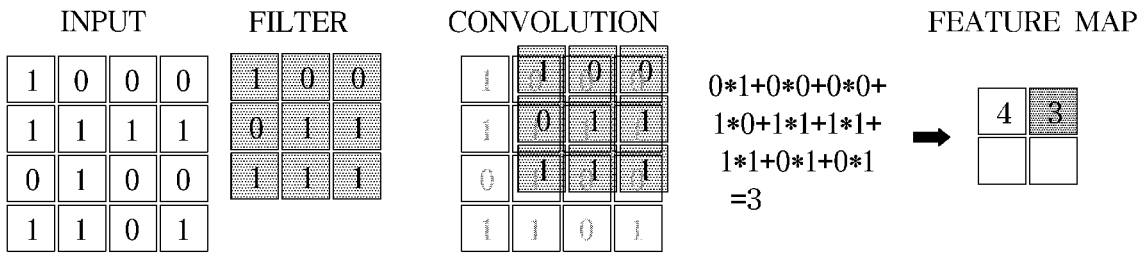

FIG. 1 shows a configuration of a vehicle according to one embodiment. FIG. 2 shows fields of view of a camera and radar included in the driver assistance apparatus according to one embodiment. FIG. 3 shows one example in which the driver assistance apparatus according to one embodiment performs a convolution of image data. FIGS. 4(A) and 4(B) are a view showing the convolution of image data by the driver assistance apparatus according to one embodiment.

As shown in FIG. 1, a vehicle 1 includes a global navigation satellite system (GNSS) signal receiver 10 (hereinafter referred to as "GNSS signal receiver"), a driving device 20, a braking device 30, a steering device 40, and/or a driver assistance apparatus 100. The GNSS signal receiver 10, the driving device 20, the braking device 30, the steering device 40, and the driver assistance apparatus 100 may communicate with one another via a vehicle communication network NT. For example, the electrical devices 10, 20, 30, 40, and 100 included in the vehicle 1 may transmit and receive data to and from each other through Ethernet, media oriented systems transport (MOST), Flexray, controller area network (CAN), local interconnect network (LIN), etc.

The GNSS signal receiver 10 may include a GNSS antenna having a dimension for receiving a signal in a frequency band (e.g., 1575.42 MHz or 1227.60 MHz) of a GNSS satellite signal. The GNSS antenna may receive the GNSS signal and provide the received GNSS signal to the GNSS signal receiver 10. The GNSS signal receiver 10 may demodulate the GNSS signal based on the received GNSS signal and identify a position of the vehicle 1 based on the demodulated signal. The GNSS signal receiver 10 may identify an intensity of the received GNSS signal. The GNSS signal receiver 10 may provide position data of the vehicle 1 and reception intensity data of the GNSS signal to a controller 140.

The driving device 20 may move the vehicle 1 and include, for example, an engine, an engine management system (EMS), a transmission, and a transmission control unit (TCU). The engine may generate a power for the vehicle 1 to travel, and the EMS may control the engine in response to a driver's acceleration intention through an accelerator pedal or a request of the driver assistance apparatus 100. The transmission may decelerate and transmit the power generated by the engine to wheels, and the TCU may control the transmission in response to a driver's transmission command through a transmission lever and/or a request of the driver assistance apparatus 100.

The braking device 30 may stop the vehicle 1 and include, for example, a brake caliper and a brake control module (EBCM). The brake caliper may decelerate the vehicle 1 or stop the vehicle 1 using friction with a brake disk, and the EBCM may control the brake caliper in response to a driver's braking intention through a brake pedal and/or a request of the driver assistance apparatus 100. For example, the EBCM may receive a deceleration request including deceleration from the driver assistance apparatus 100 and control the brake caliper electrically or through a hydraulic pressure so that the vehicle 1 decelerates depending on the requested deceleration.

The steering device 40 may include an electronic power steering (control module (EPS). The steering device 40 may change a traveling direction of the vehicle 1, and the EPS may assist an operation of the steering device 40 so that the driver easily operates a steering wheel in response to a driver's steering intention through the steering wheel. In addition, the EPS may control the steering device in response to a request of the driver assistance apparatus 100. For example, the EPS may receive a steering request including a steering torque from the driver assistance apparatus 100 and control the steering device to steer the vehicle 1 depending on the requested steering torque.

The driver assistance apparatus 100 may communicate with the GNSS signal receiver 10, the driving device 20, the braking device 30, the steering device 40, a display device 50, and an audio device 60 via the vehicle communication network NT.

The driver assistance apparatus 100 may provide various functions for safety to the driver. For example, the driver assistance apparatus 100 may provide lane departure warning (LDW), lane keeping assist (LKA), high beam assist (HBA), autonomous emergency braking (AEB), traffic sign recognition (TSR), adaptive cruise control (ACC), blind spot detection (BSD), etc.

The driver assistance apparatus 100 may include a camera 110, a radar 120, a light wave detection and ranging (Li-DAR) device 130, and the controller 140. The driver assistance apparatus 100 is not limited to that shown in FIG. 1. For example, in the driver assistance apparatus 100 shown in FIG. 1, at least one detection means among the camera 110, the radar 120, and the LiDAR device 130 may be omitted or various detection means capable of detecting objects around the vehicle 1 may be added.

The camera 110 may photograph surroundings of the vehicle 1 and acquire image data around the vehicle 1. For example, as shown in FIG. 2, the camera 110 may be installed on a front windshield of the vehicle 1 and may have a field of view 110a in front of the vehicle 1.

The camera 110 may include a plurality of lenses and an image sensor. The image sensor may include a plurality of photodiodes for converting light into electrical signals, and the plurality of photodiodes may be disposed in the form of a two-dimensional matrix. The image data may include information on other vehicles, pedestrians, cyclists, or lane lines (markers distinguishing lanes) positioned around the vehicle 1.

The camera 110 may be electrically connected to the controller 140. For example, the camera 110 may be connected to the controller 140 via the vehicle communication network NT or connected to the controller 140 via a hard wire. The camera 110 may transmit the image data around the vehicle 1 to the controller 140.

The radar 120 may transmit transmitting radio waves toward the surroundings of the vehicle 1 and detect objects around the vehicle 1 based on radio waves reflected from the surrounding objects. For example, as shown in FIG. 2, the radar 120 may be installed on a grille or a bumper of the vehicle 1 and may have a field of sensing 120a in front of the vehicle 1.

The radar 120 may include a transmission antenna (or a transmission antenna array) for radiating the transmitting radio waves toward the surroundings of the vehicle 1 and a reception antenna (or a reception antenna array) for receiving the radio waves reflected from the objects.

The radar 120 may acquire radar data from the transmitting radio waves transmitted by the transmission antenna and the reflected radio waves received by the reception antenna. The radar data may include position information (e.g., distance information) and/or speed information of the objects positioned in front of the vehicle 1.

The radar 120 may be connected to the controller 140 via, for example, the vehicle communication network NT or a hard wire and may transmit the radar data to the controller 140.

The LiDAR device 130 may emit light (e.g., infrared rays) toward the surroundings of the vehicle 1 and detect objects around the vehicle 1 based on light reflected from the surrounding objects. For example, as shown in FIG. 2, the LiDAR device 130 may be installed on a roof of the vehicle 1 and may have fields of view 130a in all directions around the vehicle 1.

The LiDAR device 130 may include a light source (e.g., a light emitting diode, a light emitting diode array, a laser diode, a laser diode array) for emitting light (e.g., infrared rays) and an optical sensor (e.g., a photodiode or a photodiode array) for receiving light (e.g., infrared rays). In addition, as necessary, the LiDAR device 130 may further include a driving device for rotating the light source and/or the optical sensor.

While the light source and/or the optical sensor rotate, the LiDAR device 130 may emit light through the light source and receive light reflected from the objects through the optical sensor, and thus acquire LiDAR data. The LiDAR data may include relative positions (distances and/or directions of the surrounding objects) and/or relative speeds of the objects around the vehicle 1.

The LiDAR device 130 may be connected to the controller 140 via, for example, the vehicle communication network NT or a hard wire and may transmit the LiDAR data to the controller 140.

The controller 140 may be electrically connected to the camera 110, the radar 120, and/or the LiDAR device 130. In addition, the controller 140 may be connected to the GNSS signal receiver 10, the driving device 20, the braking device 30, the steering device 40, the display device 50, and the audio device 60 via the vehicle communication network NT.

The controller 140 may process the position data of the GNSS signal receiver 10, the image data of the camera 110, the radar data of the radar 120, and/or the LiDAR data of the LiDAR device 130 and provide control signals to the driving device 20, the braking device 30, and/or the steering device 40.

The controller 140 may include a memory 142 and a processor 141.

The memory 142 may store programs and/or data for processing the image data, the radar data, and/or the LiDAR data. In addition, the memory 142 may store programs and/or data for generating the driving/braking/steering signals.

The memory 142 may temporarily store the image data received from the camera 110, the radar data received from the radar 120, and/or the LiDAR data received from the LiDAR device 130 and temporarily store a processing result of the image data, the radar data, and/or the LiDAR data of the processor 141.

In addition, the memory 142 may include a high definition map (HD Map). Unlike general maps, the HD map may include detailed information on surfaces of roads or intersections, such as lane lines, traffic lights, intersections, and road guide signs. In particular, in the HD map, landmarks (e.g., lane lines, traffic lights, intersections, and road guide signs) that a vehicle encounters while traveling are implemented in a three dimension.

The memory 142 may include not only a volatile memory such as a static random access memory (SRAM) or a dynamic random access memory (DRAM), but also a non-volatile memory such as a flash memory, a read only memory (ROM), or an erasable programmable read only memory (EPROM).

The processor 141 may process the image data of the camera 110, the radar data of the radar 120, and/or the LiDAR data of the LiDAR device 130. The processor 141 may generate the driving signal, the braking signal, and/or the steering signal for respectively controlling the driving device 20, the braking device 30, and/or the steering device 40 based on the processed image data of the camera 110, radar data of the radar 120, and/or LiDAR data of the LiDAR device 130.

For example, the processor 141 may include an image processor for processing the image data of the camera 110, a signal processor for processing the radar data of the radar

120 and/or the LiDAR data of the LiDAR device 130, or a micro control unit (MCU) for generating the driving/braking/steering signals.

The processor 141 may perform sensor fusion for detecting objects around the vehicle 1 by fusing the image data, the radar data, and/or the LiDAR data. Hereinafter, data on objects (e.g., lane lines, buildings, traffic infrastructure, other vehicles, pedestrians, or cyclists) provided using the sensor fusion is referred to as "object data."

The processor 141 may identify an accurate position of the vehicle 1 based on the position data, the HD map, and the object data.

The processor 141 may identify a first position of the vehicle 1 based on the position data. However, the first position may include an error due to limitations of the GNSS signal. For example, since the GNSS signal is not received in a tunnel or underground, the processor 141 may not identify the first position. In addition, an inaccurate first position may be identified between buildings due to a GNSS signal passing along multiple paths.

To compensate for the error, the processor 141 may identify a second position of the vehicle 1 based on the HD map and the object data. The processor 141 may compare a landmark at the first position of the HD map with an object of the object data and identify the second position more accurate than the first position based on the comparison between the landmark of the HD map and the object of the object data. For example, the processor 141 may identify the second position at which a relative position of the object matches a relative position of the landmark within the first position and an error range of the first position.

When the GNSS signal is not received or the reception intensity of the GNSS signal is lower than a reference value, the processor 141 may identify the first position of the vehicle 1 based on the road guide signs. When the GNSS signal is not received or the reception intensity of the GNSS signal is lower than the reference value, the processor 141 may determine that the reliability of the first position is low. Therefore, the processor 141 may extract a feature region related to the position of the vehicle 1 from the road guide signs using machine learning and identify the first position of the vehicle 1 in the extracted feature region.

For example, the processor 141 extracts the feature region related to the position of the vehicle 1 from the road guide signs using a convolutional neural network (CNN) and identify the first position of the vehicle 1 in the extracted feature region.

The processor 141 may acquire a feature map from the image data using the CNN. The CNN is widely used as an algorithm for identifying or classifying objects from image data.

The CNN may generally include a feature extraction operation of extracting a feature map of an image and a classification operation of classifying (or identifying) an object based on the extracted feature map.

The processor 141 may acquire the feature map of the image data using the feature extraction operation of the CNN.

As shown in FIG. 3, in the feature extraction operation, convolution and pooling may be repeated.

The convolution is a process of applying a filter (or a filter matrix) to image data (image matrix). As shown in FIGS. 4(*a*) and 4(*b*), image data and a filter may each have a matrix form. The processor 141 may perform the convolution between the image matrix and the filter matrix while the filter matrix moves on the image matrix at a designated interval. For example, the processor 141 may acquire a product between values of the filter matrix and corresponding values of the image matrix and acquire the sum of the acquired products.

A feature map may be acquired by the convolution between the image data and the filter. The processor 141 may acquire the feature map by the image data.

The pooling is a process of reducing a size of a feature map in order to reduce a computing load of a processor. In addition, specific data of the feature map may be highlighted by the pooling.

The pooling may be adopted as any one of a max pooling for acquiring a maximum value in a specific region, an average pooling for acquiring an average value in the specific region, or a mini pooling for acquiring a minimum value in the specific region. For example, the processor 141 may perform the max pooling for acquiring the maximum value in an adjacent **2*2** region of the feature map.

The processor 141 may acquire the feature map of the image data by repeatedly performing the convolution and the pooling on the image data.

The processor 141 may apply the acquired feature map to the classification operation of the CNN.

The classification operation of the CNN may be configured as a neural network.

The neural network may include an input layer into which image data is input, an output layer through which information on an identified object is output, and a hidden layer between the input layer and the output layer. The input layer may include a plurality of input nodes, each of which receives a luminance value of a pixel of an image. The hidden layer may include a plurality of hidden nodes, each of which receives a value obtained by applying first weights to the values of the plurality of input nodes. The output layer may include a plurality of output nodes, each of which receives a value obtained by applying second weights to the values of the plurality of hidden nodes.

The processor 141 may extract the feature region related to the position of the vehicle 1 from the road guide signs based on the values of the plurality of output nodes and identify the first position of the vehicle 1 in the extracted feature region.

A specific operation of the driver assistance apparatus 100 will be described in more detail below.

Figure 5:
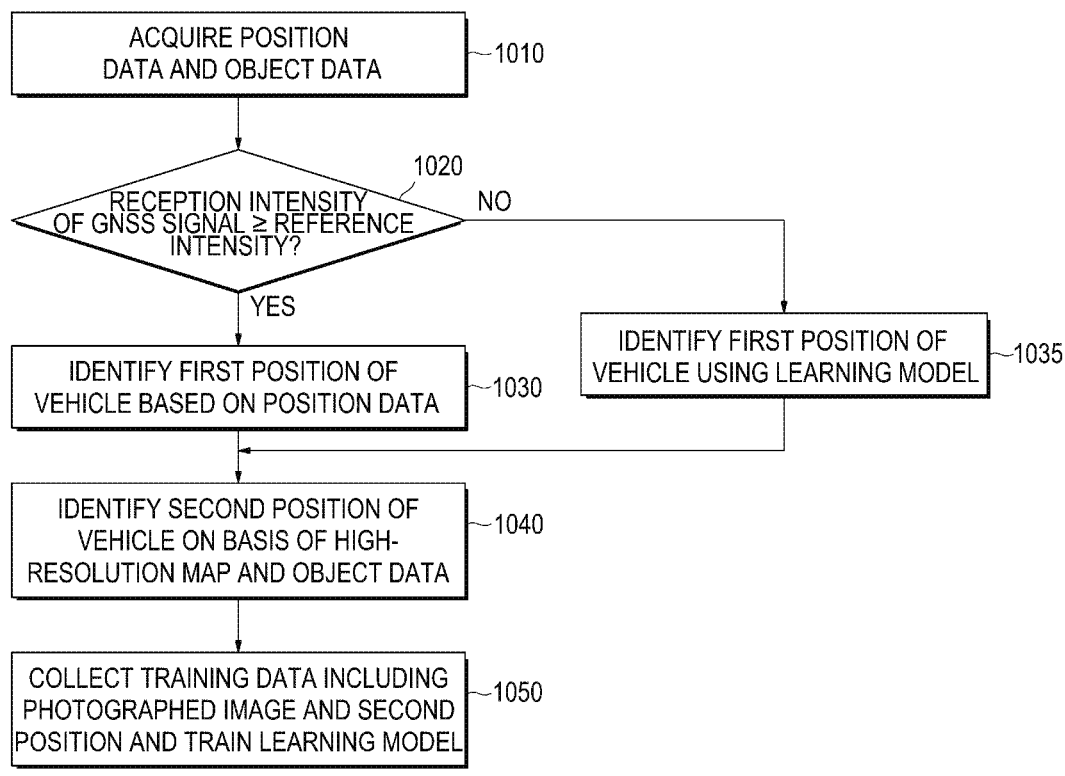
FIG. 5 shows a method in which the driver assistance apparatus according to one embodiment identifies a position of a vehicle.

FIG. 5 shows a method in which the driver assistance apparatus according to one embodiment identifies a position of a vehicle.

Referring to FIG. 5, the driver assistance apparatus 100 may acquire the position data and the object data of the vehicle 1 (1010).

The GNSS signal receiver 10 may receive a GNSS signal and identify the reception intensity of the GNSS signal. The GNSS signal receiver 10 may transmit position data of the vehicle 1 based on the received GNSS signal to the driver assistance apparatus 100. The processor 141 may acquire the position data of the vehicle 1 from the GNSS signal receiver 10.

The processor 141 may receive image data, radar data, or LiDAR data from the camera 110, the radar 120, or the LiDAR device 130, respectively, and acquire object data around the vehicle 1 using sensor fusion.

The driver assistance apparatus 100 may identify whether the reception intensity of the GNSS signal is greater than or equal to a reference intensity (1020).

The processor 141 may acquire information on the reception intensity of the GNSS signal from the GNSS signal receiver 10 and identify whether the reception intensity of the GNSS signal is greater than or equal to the reference intensity based on the comparison between the reception intensity of the GNSS signal and the reference intensity.

When the reception intensity of the GNSS signal is greater than or equal to the reference intensity (YES in 1020), the driver assistance apparatus 100 may identify a first position of the vehicle 1 based on the position data (1030).

When the reception intensity of the GNSS signal is greater than or equal to the reference intensity, the processor 141 may determine that the position data based on the GNSS signal has high reliability. Therefore, the processor 141 may identify the first position of the vehicle 1 based on the position data acquired by the GNSS signal receiver 10.

The driver assistance apparatus 100 may identify a second position of the vehicle 1 based on the HD map and the object data (1040).

The first position based on the GNSS signal may include some errors. For example, when the vehicle 1 travels between buildings, the reliability of the GNSS signal may be degraded by the reflection of the GNSS signal from the buildings.

Therefore, the processor 141 may compensate the first position based on the GNSS signal based on the HD map and the object data. In other words, the processor 141 may identify the second position based on the matching between the HD map and the object data.

The processor 141 may acquire information on the first position and landmarks around the first position from the HD map. For example, the processor 141 may acquire the first position and geographic information on the first position and roads, lane lines, traffic infrastructure, buildings, or the like therearound. The processor 141 may identify a position at which the relative position of the object based on the object data matches the relative position of the landmark of the HD map as the second position.

The driver assistance apparatus 100 may collect training data including the photographed image and the second position and train a learning model (1050).

The processor 141 identifying the second position may collect training data including the image data acquired from the camera 110 and the second position.

The processor 141 may identify whether road guide signs are included in the acquired image data. When the road guide signs are included in the acquired image data, the processor 141 may train the learning model using the image data and the second position.

For example, the learning model may include a CNN. The CNN may include a feature extraction operation of extracting a feature map of an image and a classification operation of classifying (or identifying) an object based on the extracted feature map. The processor 141 may acquire the feature map of the image data by repeatedly performing convolution and pooling on the image data and train the neural network included in the learning model using the feature map.

The processor 141 may input the image data to the learning model and acquire an output of the learning model. The output of the learning model may include a position (or coordinates) estimated by the learning model based on the image data of the road guide signs. The processor 141 may identify an error between the second position identified by the HD map and the object data and the position estimated by the learning model and train the learning model based on the identified error. For example, the processor 141 may train the learning model using error backpropagation.

In operation 1020, when the reception intensity of the GNSS signal is smaller than the reference intensity (No in 1020), the driver assistance apparatus 100 may identify the first position of the vehicle 1 using the learning model (1035).

When the reception intensity of the GNSS signal is smaller than the reference intensity, the processor 141 may determine that the position data based on the GNSS signal has low reliability. Therefore, the processor 141 does not identify the first position of the vehicle 1 based on the position data acquired from the GNSS signal receiver 10.

The processor 141 may estimate the first position of the vehicle 1 using the learning model trained in operation 1050. The learning model may include the CNN.

The processor 141 may input the image data to the learning model and acquire an output of the learning model. The output of the learning model may include a position (or coordinates) estimated by the learning model based on the image data of the road guide signs. The processor 141 may identify a position output from the learning model as the first position.

As described above, the driver assistance apparatus 100 may estimate the position of the vehicle 1 using the road guide signs and the learning model when the reliability of the GNSS signal is low. Therefore, the driver assistance apparatus 100 may stably assist the traveling of the vehicle 1 without missing the position of the vehicle 1 while traveling.

Figure 6:
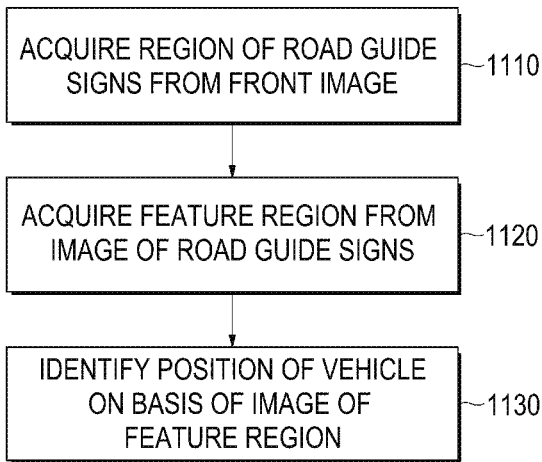
FIG. 6 shows one example in which the driver assistance apparatus according to one embodiment trains a learning model.
Figure 7:
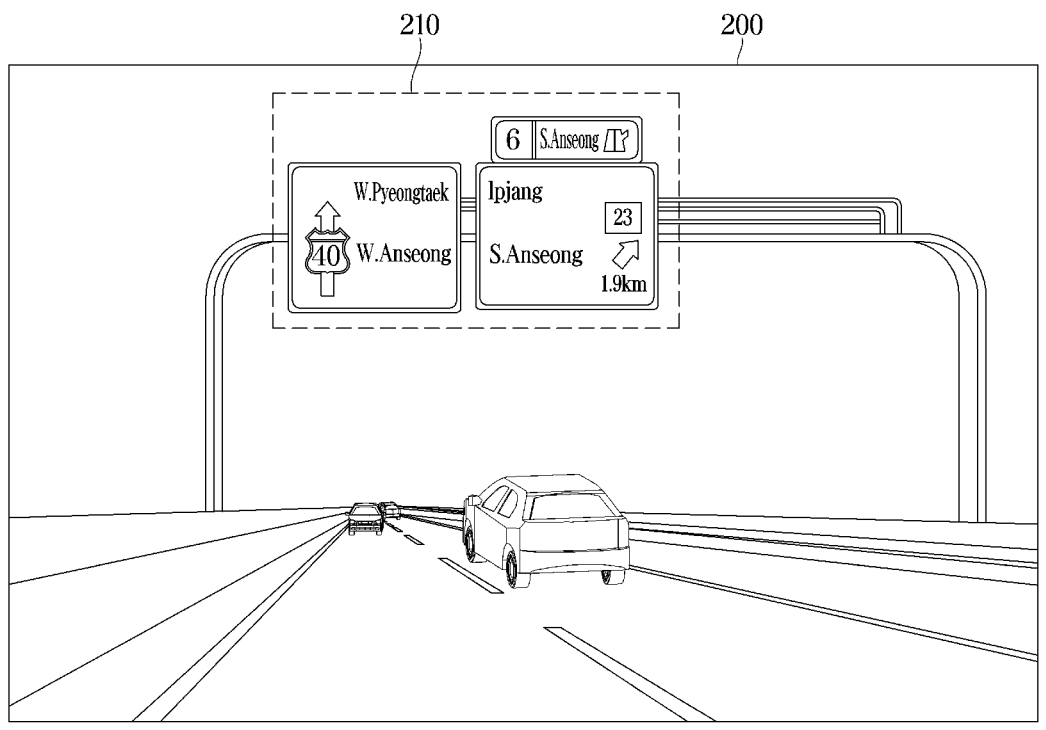
FIG. 7 shows one example in which the driver assistance apparatus according to one embodiment extracts road guide signs.

Hereinafter, FIG. 6 shows one example in which the driver assistance apparatus according to one embodiment trains a learning model. FIG. 7 shows one example in which the driver assistance apparatus according to one embodiment extracts road guide signs. FIG. 8 shows one example in which the driver assistance apparatus according to one embodiment identifies a feature region of the road guide signs.

Referring to FIGS. 6, 7, and 8, the driver assistance apparatus 100 may acquire a road guide sign region from the image photographed by the camera 110 (1110).

As shown in FIG. 7, the processor 141 may acquire a forward image 200 of the vehicle 1 from the camera 110. The processor 141 may extract a road guide sign region 210 from the forward image 200 through the pre-processing of the image.

The processor 141 may acquire the road guide sign region 210 using the learning model. For example, the learning model may include the CNN. The processor 141 may input the forward image 200 to the learning model being trained and acquire a reference pixel and size (the number of horizontal pixels and the number of vertical pixels) of the road guide sign region 210 from the learning model being trained. The processor 141 may calculate an error and train the learning model being trained using error backpropagation.

After training the learning model, the processor 141 may input the forward image 200 to the trained learning model and acquire the road guide sign region 210 from the trained learning model.

The driver assistance apparatus 100 may acquire a feature region from the image of the road guide signs (1120).

As shown in FIG. 8, the processor 141 may acquire a road guide sign image 220. The processor 141 may extract a feature region 230 from the road guide sign image 220.

The processor 141 may acquire the feature region 230 using the learning model. For example, the processor 141 may input the road guide sign image 220 to the learning model being trained and acquire a reference pixel and size (the number of horizontal pixels and the number of vertical pixels) of the feature region 230 from the learning model being trained. The processor 141 may calculate an error and train the learning model being trained using error backpropagation.

After training the learning model, the processor 141 may input the road guide sign image 220 to the trained learning model and acquire the feature region 230 from the trained learning model.

The driver assistance apparatus 100 may identify the position of the vehicle 1 based on the image of the feature region (1130).

As shown in FIG. 8, the processor 141 may acquire a feature region 230.

The processor 141 may identify a position of the vehicle 1 in the feature region 230 using the learning model. For example, the processor 141 may input the feature region 230 to the learning model being trained and acquire the position of the vehicle 1 from the learning model being trained. The processor 141 may calculate an error and train the learning model being trained using error backpropagation.

After training the learning model, the processor 141 may input the feature region 230 to the trained learning model and acquire information related to the position of the vehicle 1 from the trained learning model. For example, the processor 141 may acquire a number of a road on which the vehicle 1 is traveling, a regional name, a distance to a junction, and the like.

The processor 141 may identify the position of the vehicle 1 based on the road number, the regional name, and the distance to the junction. For example, the processor 141 may identify the position of the junction based on the road number and the regional name. In addition, the processor 141 may identify the position of the vehicle 1 by reversely calculating from a position of the junction along the road as much as a distance to the junction.

As described above, when the GNSS signal is not received or the reliability of the GNSS signal is low, the driver assistance apparatus 100 may acquire information on the position of the vehicle from the road guide signs using the learning model and identify the position of the vehicle based on the information on the position of the vehicle.

As is apparent from the above description, it is possible to provide a driver assistance apparatus capable of identifying a position of a vehicle using road guide signs.

It is possible to provide a driver assistance apparatus and a driver assistance method capable of acquiring position information from road guide signs using machine learning.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A driver assistance apparatus comprising:
a camera installed on a vehicle, having a forward field of view of the vehicle, and configured to acquire image data; and
a processor configured to process the image data,
wherein the processor is configured to:
acquire image data of road guide signs from the image data;
extract a feature region from the image data of the road guide signs; and
identify a road number, a regional name, and a distance to a junction based on the image data of the feature region; and
identify a position of the vehicle based on the image data of the road guide signs, including a road number, a regional name, and a distance to a junction;
identify a position of the junction based on the road number and the regional name; and
identify, as the position of the vehicle, a position moved from the position of the junction along a road of the road number as much as the distance to the junction; and
identify a position of the vehicle based on an output signal of a global navigation satellite system (GNSS) signal receiver of the vehicle; and identify a position of the vehicle based on the image data of the road guide signs based on a reception intensity of a GNSS signal of the GNSS signal receiver being smaller than or equal to a reference intensity.

2. The driver assistance apparatus of claim 1, wherein the processor is configured to:
train a learning model based on the position of the vehicle based on the output signal of the GNSS signal receiver and the image data; and identify a position of the vehicle using the trained learning model based on the signal intensity of the GNSS signal of the GNSS signal receiver being smaller than or equal to the reference intensity.

3. The driver assistance apparatus of claim 2, wherein the processor is configured to:
acquire a feature region from the image data of the road guide signs using the trained learning model; and
identify the position of the vehicle based on image data of the feature region using the trained learning model.

4. The driver assistance apparatus of claim 2, wherein the learning model includes a convolutional neural network (CNN), and
the processor is configured to:
input the image data into the CNN;
identify an estimated position of the vehicle based on an output of the CNN; and
train the CNN based on an error between the position of the vehicle based on the output signal of the GNSS signal receiver and the estimated position.

5. The driver assistance apparatus of claim 2, wherein the learning model includes a convolutional neural network (CNN), and
the processor is configured to:
input the image data into the trained CNN; and
identify a position of the vehicle based on an output of the trained CNN.

6. A driver assistance method comprising:
acquiring image data through a camera having a forward field of view of a vehicle;
acquiring image data of road guide signs from the image data;
extracting a feature region from the image data of the road guide signs;
identifying a road number, a regional name, and a distance to a junction based on the image data of the feature region; and
identifying a position of the vehicle based on the image data of the road guide signs, including a road number, a regional name, and a distance to a junction;
identifying a position of a junction based on the road number and the regional name; and
identifying, as the position of the vehicle, a position moved from the position of the junction along a road of the road number as much as the distance to the junction; and
identifying a position of the vehicle based on an output signal of a global navigation satellite system (GNSS) signal receiver of the vehicle; and
identifying a position of the vehicle based on the image data of the road guide signs based on a reception intensity of a GNSS signal of the GNSS signal receiver being smaller than or equal to a reference intensity.

7. The driver assistance method of claim 6, wherein the identifying of the position of the vehicle includes:
training a learning model based on the position of the vehicle based on the output signal of the GNSS signal receiver and the image data; and
identifying a position of the vehicle using the trained learning model based on the reception intensity of the GNSS signal of the GNSS signal receiver being smaller than or equal to the reference intensity.

8. The driver assistance method of claim 7, wherein the identifying of the position of the vehicle includes:
acquiring a feature region from the image data of the road guide signs using the trained learning model; and identifying a position of the vehicle based on image data of the feature region using the trained learning model.

9. The driver assistance method of claim 7, wherein the learning model includes a convolutional neural network (CNN), and the training of the learning model includes:

inputting the image data into the CNN;

identifying an estimated position of the vehicle based on an output of the CNN; and training the CNN based on an error between the position of the vehicle based on the output signal of the GNSS signal receiver and the estimated position.

10. The driver assistance method of claim 7, wherein the learning model includes a convolutional neural network (CNN), and the identifying of the position of the vehicle includes:

inputting the image data into the trained CNN; and identifying a position of the vehicle based on an output of the trained CNN.

11. A driver assistance apparatus comprising:

a camera installed on a vehicle, having a forward field of view of the vehicle, and configured to acquire image data; and a processor configured to process the image data, wherein the processor is configured to:

acquire image data of road guide signs from the image data;

identify a first position of the vehicle based on the image data of the road guide signs, including identifying a road number, a regional name, and a distance to a junction based on the image data of the road guide signs, identifying a position of the junction based on the road number and the regional name, and identifying, as the first position, a position moved from the position of the junction along a road of the road number as much as the distance to the junction; and identify a position of the vehicle based on an output signal of a global navigation satellite system (GNSS) receiver of the vehicle; and identify the first position of the vehicle based on the image data of the road guide signs based on a reception intensity of a GNSS signal of the GNSS receiver being smaller than or equal to a reference intensity; and identify a second position of the vehicle based on a comparison between a landmark in a high-definition map and object data detected by one or more sensors of the vehicle.

12. The driver assistance apparatus of claim 11, wherein the object data is generated by sensor fusion of at least two types selected from the group consisting of image data from the camera, radar data, and LiDAR data.

13. The driver assistance apparatus of claim 11, wherein the landmark in the high-definition map comprises at least one of a road guide sign, a lane line, a traffic light, or a building.

14. The driver assistance apparatus of claim 11, wherein the processor is configured to compare a relative position of the detected object data with a relative position of a landmark in the high-definition map within a predetermined position error range.

15. The driver assistance apparatus of claim 11, wherein the processor is configured to acquire a position of the vehicle based on position data of the vehicle provided from a global navigation satellite system (GNSS) receiver of the vehicle.

* * * * *